US009281674B2

(12) United States Patent
Walgenbach et al.

(10) Patent No.: US 9,281,674 B2
(45) Date of Patent: Mar. 8, 2016

(54) METHOD OF BUSWAY CONSTRUCTION (71) Applicant: Schneider Electric USA, Inc., Palatine, IL (US)

(72) Inventors: Jacob E. Walgenbach, North Liberty, IA (US); James Raymond Ramsey, Murfreesboro, TN (US); Timothy P. O'Leary, Antioch, TN (US); Thomas Patrick McCrocklin, Nashville, TN (US)

(73) Assignee: SCHNEIDER ELECTRIC USA, INC., Schaumburg, IL (US)

( * ) Notice: Subject to any disclaimer, the term of this patent is extended or adjusted under 35 U.S.C. 154(b) by 242 days.

(21) Appl. No.: 13/666,390

(22) Filed: Nov. 1, 2012

(65) Prior Publication Data

US 2014/0116617 A1    May 1, 2014

(51) Int. Cl.
| | |
|---|---|
| *B29C 65/00* | (2006.01) |
| *B32B 37/00* | (2006.01) |
| *B32B 38/10* | (2006.01) |
| *B32B 17/10* | (2006.01) |
| *B32B 38/00* | (2006.01) |
| *B29C 65/48* | (2006.01) |
| *H02G 5/00* | (2006.01) |

(Continued)

(52) U.S. Cl.
CPC .................. *H02G 5/06* (2013.01); *B29C 65/48* (2013.01); *B29C 66/45* (2013.01); *B32B 15/08* (2013.01); *B32B 15/20* (2013.01); *H02G 5/10* (2013.01)

(58) Field of Classification Search
CPC .... B29C 66/1122; B29C 65/00; B29C 66/40; B29C 66/41; B29C 66/45; B29C 65/48; C09J 5/00; C09J 5/02; B32B 15/00; B32B 15/04; B32B 15/08; B32B 15/092; B32B 15/20; H02G 5/00; H02G 5/005; H02G 5/06
USPC ............... 156/47, 48, 51, 60, 71, 91, 92, 196, 156/210, 242, 244.11, 244.13, 244.15, 156/244.22, 244.27, 250, 252, 272.2, 273.9, 156/283, 293, 294, 295, 296; 174/68.1, 174/68.2, 70 R, 71 R, 71 B, 84 R, 88 R, 88 B, 174/99 R, 99 B, 70 B; 439/212, 213
See application file for complete search history.

(56) References Cited

U.S. PATENT DOCUMENTS

| | | | | |
|---|---|---|---|---|
| 3,202,756 | A | * | 8/1965 | Stanback ................. H02G 5/06 174/117 FF |
| 3,726,988 | A | * | 4/1973 | Davis ....................... H02G 5/06 174/117 FF |

(Continued)

OTHER PUBLICATIONS

Square D; Distribution Equipment Fundamentals; Terms and Concepts Fundamental to the Understanding of Square D Distribution Equipment and its Application; Dated 1989; pp. 1, 3 and 91-98 (10 pages).

*Primary Examiner* — Philip Tucker
*Assistant Examiner* — Brian R Slawski
(74) *Attorney, Agent, or Firm* — Locke Lord LLP (57) ABSTRACT

A busway and a method of assembling the same in which a flowable, uncured epoxy is applied between insulated busbar conductors that are stacked on top of one another and inner surfaces of the busway housing into which the stacked conductors are placed to form an enclosed busway. The busbar conductors are insulated by an epoxy powder coat, which can develop pinholes during the curing of the epoxy powder. A flowable, curable dielectric material, such as epoxy, is applied between the outermost busbar conductors and the inner surfaces of the top and bottom pieces of the busway housing. Optionally, epoxy is also applied between adjacent pairs of busbar conductors, which are stacked and arranged into the housing. Pressure is applied to the housing stack, and the epoxy is allowed to cure, resulting in a busway having superior thermal performance, dielectric integrity, and mechanical strength compared to conventional busways.

21 Claims, 5 Drawing Sheets (51) Int. Cl.
*H02G 5/06* (2006.01)
*B32B 15/08* (2006.01)
*B32B 15/20* (2006.01)
*H02G 5/10* (2006.01)

(56) References Cited

U.S. PATENT DOCUMENTS

| | | | |
|---|---|---|---|
| 3,956,574 A * | 5/1976 | Weimer | H02G 5/06 |
| | | | 174/117 FF |
| 4,804,804 A | 2/1989 | Hibbert et al. | |
| 5,442,135 A * | 8/1995 | Faulkner et al. | 174/68.2 |
| 5,686,169 A * | 11/1997 | Hassall et al. | 428/195.1 |
| 5,854,445 A * | 12/1998 | Graham | H02G 5/007 |
| | | | 174/133 B |
| 2002/0193035 A1* | 12/2002 | Wei et al. | 445/22 |
| 2004/0069527 A1* | 4/2004 | Vanhoutte | H02G 5/005 |
| | | | 174/149 B |
| 2007/0178723 A1* | 8/2007 | Kataoka et al. | 439/76.2 |
| 2008/0196924 A1* | 8/2008 | Beulque | 174/117 A |
| 2009/0145625 A1 | 6/2009 | Bhathija et al. | |

\* cited by examiner

METHOD OF BUSWAY CONSTRUCTION

FIELD OF THE INVENTION

The present disclosure relates generally to assembling and constructing busways, and, more particularly, to systems and methods of assembling or constructing busways with enhanced thermal performance, dielectric integrity, and mechanical strength.

BACKGROUND OF THE INVENTION

A typical busway contains multiple busbar conductors sandwiched together and installed within a metal housing to form the busway. Each busbar conductor can carry a different phase of electrical current (sometimes referred to as a pole) or a neutral current and therefore must be dielectrically insulated from adjacent busbar conductors to prevent cross-phase electrical shorts and from the grounded metal busway housing to prevent ground faults. The busway can be of a feeder type, for long straight runs of electrical current, or a plug-in type, which allows for the connection of plug-in or bolt-on devices to branch circuits. Busways carry massive amounts of electrical current and get hot as a result. Thus, thermal management of a busway is an important consideration because heat reduces the overall current-carrying efficiency of the busway as some of the energy carried by the busbars is dissipated and lost as heat before it reaches an intended electrical load. Another important consideration is the mechanical integrity of the busway, especially during a short circuit event, where electromagnetic or electro-dynamic forces produced during a short circuit event operate to repel the conductors away from one another, compromising the electrical and mechanical integrity of the busbars and the busway housing. Busway designers have struggled to balance increasing the busway's mechanical strength while improving its thermal performance, all the while making the busway smaller, lighter, stronger, and more efficient.

Moreover, some busbars are coated on all exposed surfaces with a dielectric epoxy powder, which is allowed to cure, but during the curing process, tiny pinholes can appear at random places through the cured epoxy coating that expose the metal busbar. These holes can be responsible for creating undesired current paths from the busbar conductor when energized to the grounded busbar housing, so they need to be plugged. But first, any holes that exist need to be located, which is a labor-intensive process that involves, in one known dielectric test, sweeping an energized brush across the entire surface of both sides of the epoxy coating of an energized busbar while monitoring for a leakage current to identify a hole in the coating. Once a hole is discovered, the epoxy around the discovered hole can be drilled to make it larger, and then an epoxy is manually applied to the drilled hole and allowed to cure. This discovery and curing process can take up to an hour or more per busbar per busway. The integrity of all dielectric interfaces between energized conductors and energized and grounded surfaces must be maintained to ensure that no unintended current paths exist in the busway.

What is needed is an improved system and method of assembling a busway that yields an optimum level of mechanical strength and thermal performance and has unassailable dielectric integrity between and among grounded and energized conducting surfaces. Aspects of the present disclosure address these and other needs.

SUMMARY OF THE INVENTION

A busway, as that term is understood by persons familiar with electrical distribution systems, is disclosed in which an epoxy is provided between an outer surface of an insulated busbar conductor and an inner surface of a housing of the busway. The housing has multiple pieces, such a top, a bottom, and two opposing sides, which collectively surround the busbar conductors of which there can be three or four, for example, depending on the number of poles. Each busbar conductor has an elongate shape and is coated with or surrounded by a dielectric, such as an epoxy powder coating. It should be understood that a "busbar conductor" as used herein can include the dielectric coating around the metal portion of the busbar conductor. Uncured epoxy is applied to an inner surface of a piece of the housing, such as the top piece of the housing, and optionally spread evenly across the inner surface. A first of the busbar conductors is installed into the housing and abuts the inner surface of the piece of the housing. More uncured epoxy is applied over an exposed surface of the first busbar conductor and optionally spread evenly across the exposed surface along the elongate length of the first busbar conductor. A second of the busbar conductors is installed into the housing over the first busbar conductor. Additional busbar conductors are installed into the busway housing in the same manner such that between each adjacent pair of busbar conductors, a thin layer of uncured epoxy is present. Finally, uncured epoxy is applied over an exposed surface of the topmost busbar conductor, and another piece of the housing, such as the bottom piece, is installed over the busbar conductors.

The uncured epoxy has a low viscosity, and a cure time that slightly exceeds the time to install all of the busbar conductors into the busway housing. When applied in a thin layer, the epoxy improves thermal performance by reducing thermal contact resistance by displacing air and bonding the two surfaces together. The epoxy is applied in a thin layer so the additional thermal resistance due to its presence is negligible to the busway. Then, the epoxy cures quickly once the assembly of the busway has been completed. The quantity of uncured epoxy applied to a surface of a housing piece or a busbar conductor is sufficient to completely coat the surface without an excess amount of epoxy running into spaces at the edges of the busbar conductors.

In another implementation, uncured epoxy is applied only between the topmost busbar conductor and an inner surface of a first piece of the busway housing (e.g, the top piece) and between the bottommost busbar conductor and an inner surface of a second piece (e.g., the bottom piece) of the busway housing. No epoxy is applied between adjacent busbar conductors. When the busbar conductors are coated with a dielectric material, the probability that two busbar conductors will have respective holes that are aligned is very low, so it is not as important to apply the epoxy between adjacent busbar conductors. However, when the busway housing is uncoated (with a dielectric), if there are any holes in the busbar conductors that face the housing, a direct pathway for electrical current would exist between the exposed energized busbar conductor and the grounded busway housing.

Once all of busbar conductors have been installed into the busway housing and the epoxy has been applied between the outermost busbar conductors and the adjacent inner surfaces of the busway housing, an external pressure is applied to squeeze the busbar conductors together. This action causes the epoxy, which has not fully cured yet, to flow or coat the entire surface to which it was applied. Excess epoxy may ooze out of the sides of the busbar conductors, but an optimal amount of epoxy is applied to minimize any oozing of excess epoxy. The epoxy is allowed to cure, which preferably occurs within minutes after the conductors are pressed together. The pressure is conventionally applied to flatten the busbar conductors into a straight and true configuration, but the pressure now has the added benefit of squeezing the epoxy over the entirety of the surface to which it was applied.

The foregoing and additional aspects and implementations of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

DETAILED DESCRIPTION

Although this detailed description will be described in connection with certain aspects and/or implementations, it will be understood that the present disclosure is not limited to those particular aspects and/or implementations. On the contrary, the present disclosure is intended to cover all alternatives, modifications, and equivalent arrangements included within the scope of the invention as defined by the appended claims. The application of the aspects of the present disclosure can be extended to any device of any size and rated voltage per pole, when all active poles are already used in one polarity.

Figure 1:
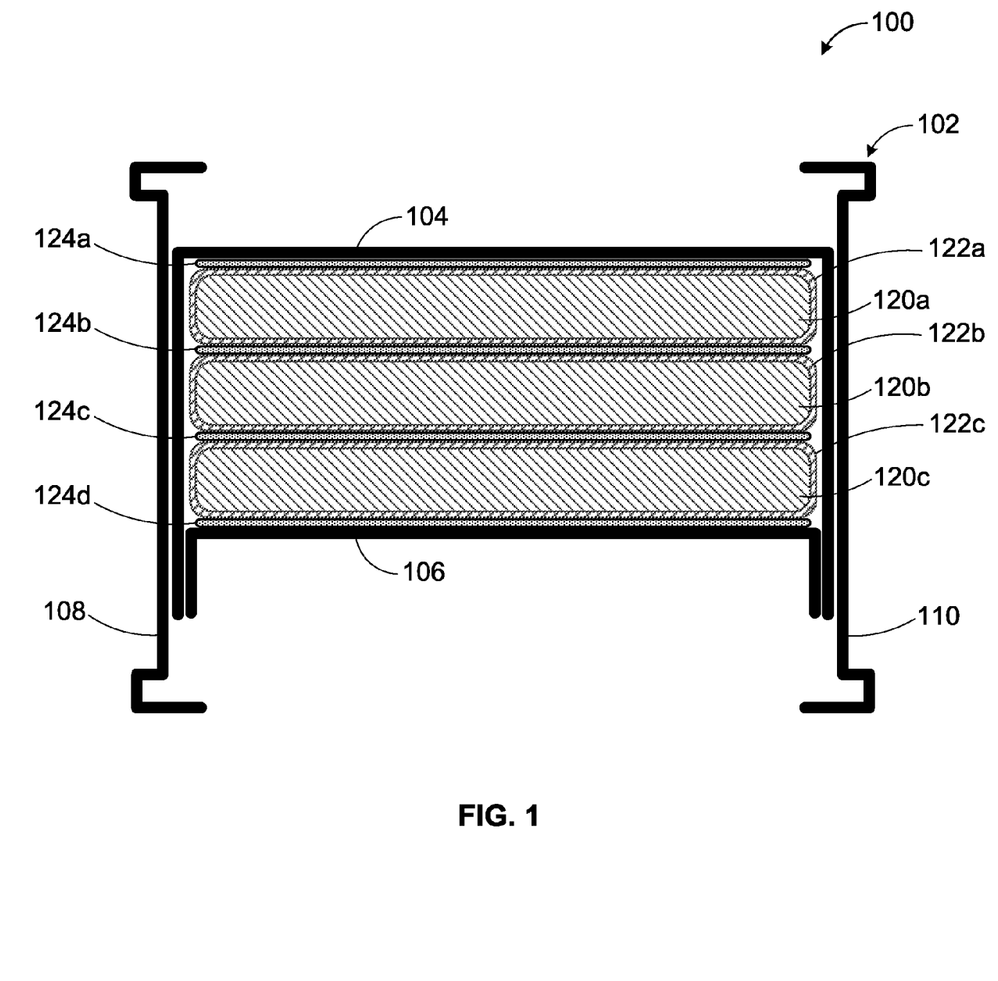
FIG. 1 is a cross-sectional view of a busway according to an aspect of the present disclosure that houses three busbar conductors with epoxy applied between inner surfaces of the housing and adjacent pairs of conductors.

Referring now to FIG. 1, a cross-sectional view of a busway 100 is shown according to an aspect of the present disclosure. The busway 100 includes a housing 102 having multiple pieces including a top piece 104, a bottom piece 106, a first side piece 108, and a second side piece 110. The housing 102 houses three busbar conductors, namely a first busbar conductor 120a, a second busbar conductor 120b, and a third busbar conductor 120c, which are composed of metal but can be composed of any electrically conducting metal or compound. Each of the first, second, and third busbar conductors 120a,b,c has a corresponding first, second, and third electrically insulating coat 122a,b,c. The electrically insulating coat 122a,b,c surrounds at least a section of the respective busbar conductors 120a,b,c. By "at least a section," it is meant that the electrically insulating coat 122a,b,c does not necessarily have to surround the end edges of the busbar conductors 120a,b,c nor cover an entire surface of the busbar conductors 120a,b,c.

Although three busbar conductors 120a,b,c are shown in FIG. 1, it is understood that any number of busbar conductors can be used without departing from the scope of the present disclosure. Furthermore, sometimes the term busbar is referred to as a "bus bar," and these terms are used synonymously and interchangeably herein.

The terms top and bottom when referring to the housing 102 are interchangeable and are not intended to convey any specific orientation relative to earth. The top piece 104 opposes the bottom piece 106, and the two side pieces 108, 110 are arranged between the top and bottom pieces 104, 106. Depending on the orientation of the busway 100 when installed, the side pieces 108, 110 can actually be arranged in a top and bottom orientation relative to earth. Alternately, if the busway 100 is installed upside down, the bottom piece 106 is actually on top (relative to earth) compared to the bottom of the busway 100. Thus, the terms "top," "bottom," and "side" of the housing are not intended to limit the disclosure to a specific orientation in space.

In some configurations, the busbar conductor 120a can be referred to as the topmost or outer conductor, and the busbar conductor 120c can be referred to the bottommost or outer conductor, meaning that the topmost or bottommost or outer conductors are adjacent to only one other conductor. The busbar conductor 120b can be referred to as an inner or middle conductor, meaning that it is sandwiched between two other conductors, which can be another inner or middle conductor or an outer conductor. For example, in a four-pole configuration, four busbar conductors are stacked on top of one another to form two outer busbar conductors and two inner busbar conductors.

The electrically insulating coats 122a,b,c that surround the respective busbar conductors 120a,b,c can be made from any electrically insulating material, such as, for example, an epoxy powder. The busbar conductors 120a,b,c are elongate, generally rectangular in shape, and can have rounded edges as shown in the cross-sectional view of FIG. 1. The insulating coats 122a,b,c surround or encircle the areas of the conductors 120a,b,c where they would otherwise make contact with another energized conductor (carry a different phase or pole of electricity, for example) or with another grounded conductor, such as the housing 102. As mentioned above, when the insulating coat 122a,b,c is made from an epoxy powder, small pinholes can randomly form during the curing process, which expose the bare metal busbar conductor 120a,b,c where the pinhole appears. Without implementing the inventive aspects disclosed herein, the busbar conductors 120a,b,c remain vulnerable to short circuits or ground faults where the pinholes appear in the epoxy powder coating. As noted above, when the term "busbar conductor" is used herein, it can refer to the bare exposed (or "naked") metal busbar conductor, or the busbar conductor 120 together with its insulating coat 122. Colloquially speaking, for example, we conventionally refer to a "wire" even though the wire includes a conductor surrounded by an insulator. In the same way, a "busbar conductor" as used herein can also include its surrounding dielectric coating, such as the electrically insulating coat 122. Plugging any pinholes that develop in the bare busbar conductors 120a,b,c is paramount to maintain the dielectric integrity between energized conductors and grounded metals. Although an advantage of the numerous inventive aspects disclosed herein is enhancing the dielectric integrity of the busway compared to prior art busways by plugging any small holes in the epoxy powder coating surrounding the busbar conductors, it should be understood that other additional or alternative advantages are achieved by the inventive aspects disclosed herein, including improvements in the thermal performance of the busway 100 and enhancement of the mechanical strength of the busway 100. Enhancing the dielectric integrity, thermal performance, or mechanical strength represent, individually and in combination, distinct advantages, objects, results, and/or improvements of the inventive aspects disclosed herein.

A flowable dielectric material is applied as described in more detail below between each of the conductors 120*a,b,c* and between the outermost conductors 120*a,c* and an inner surface of the top and bottom pieces 104, 106 of the housing 102 to form dielectric layers or interfaces 124*a,b,c,d*. When the dielectric material is initially applied as an uncured epoxy adhesive, in one non-limiting example, once the epoxy cures, the material forms the layers 124*a-d*, which improves the mechanical integrity of the busway 100. During short circuit events, one or more of the busbar conductors 120*a,b,c* will be repelled away from the energy of the short circuit, compromising the structural and mechanical integrity of the housing 102. When the dielectric material is an epoxy that cures to form an adhesive layer between and among conducting surfaces, such as the exposed metal on the inside of the busway housing 102 or pinholes that can form randomly across the surfaces of the insulating coats 122*a,b,c*, the adhesive layers enhance the mechanical integrity of the busway 100 and its ability to withstand short circuits and other electrical faults without compromising the mechanical structure of the busway 100. Additionally or alternately, the epoxy operates to provide a reliable dielectric separation between and among adjacent energized and grounded surfaces, such as by plugging or covering any holes that might have formed during curing of the insulating coats 122*a,b,c*. Additionally or alternately, the epoxy operates to improve the thermal performance of the busway 100, as explained in more detail below in connection with FIG. 4.

Figure 2:
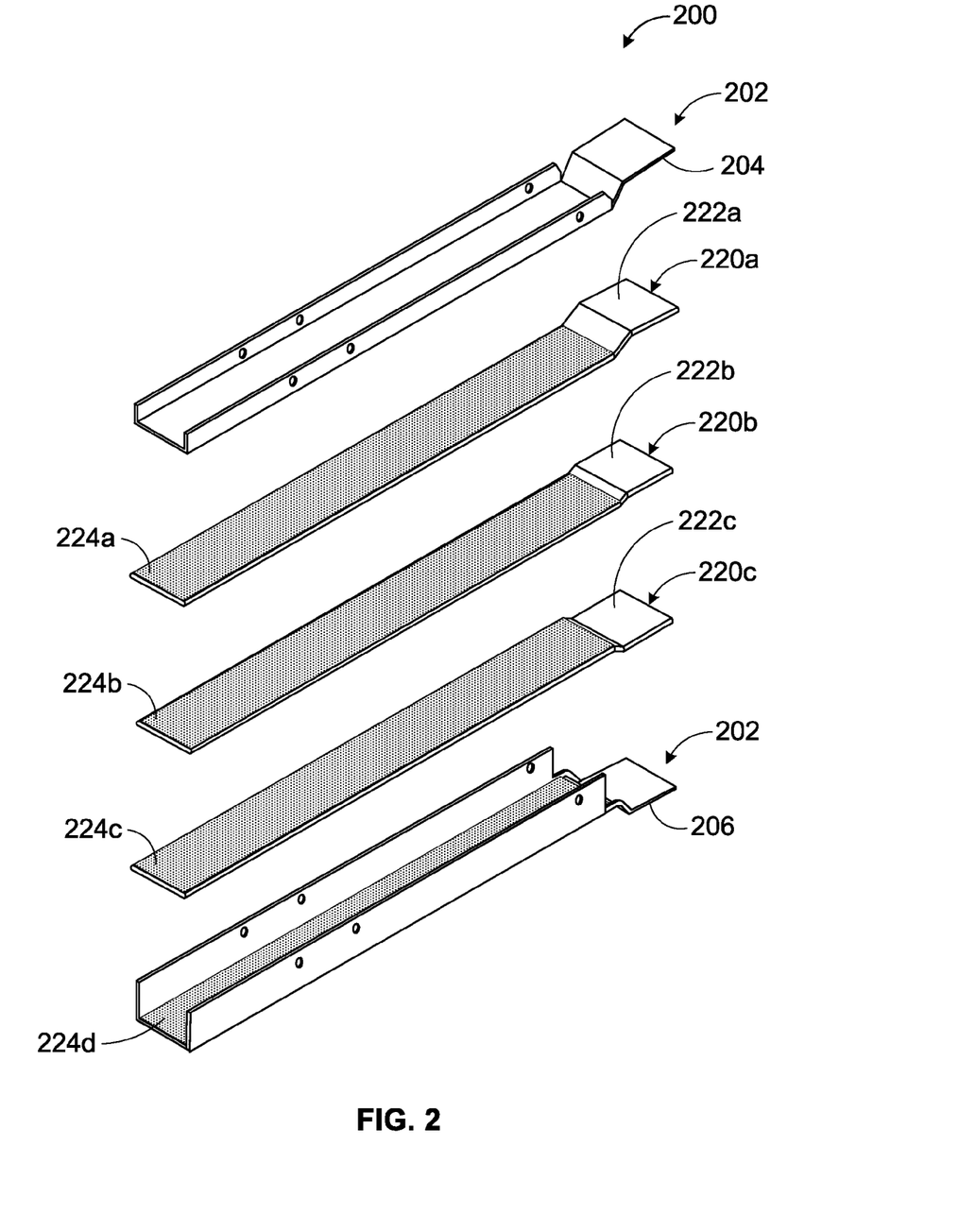
FIG. 2 is an exploded isometric view of a three-pole feeder-type busway with epoxy applied to various inner surfaces within the busway housing.
Figure 3:
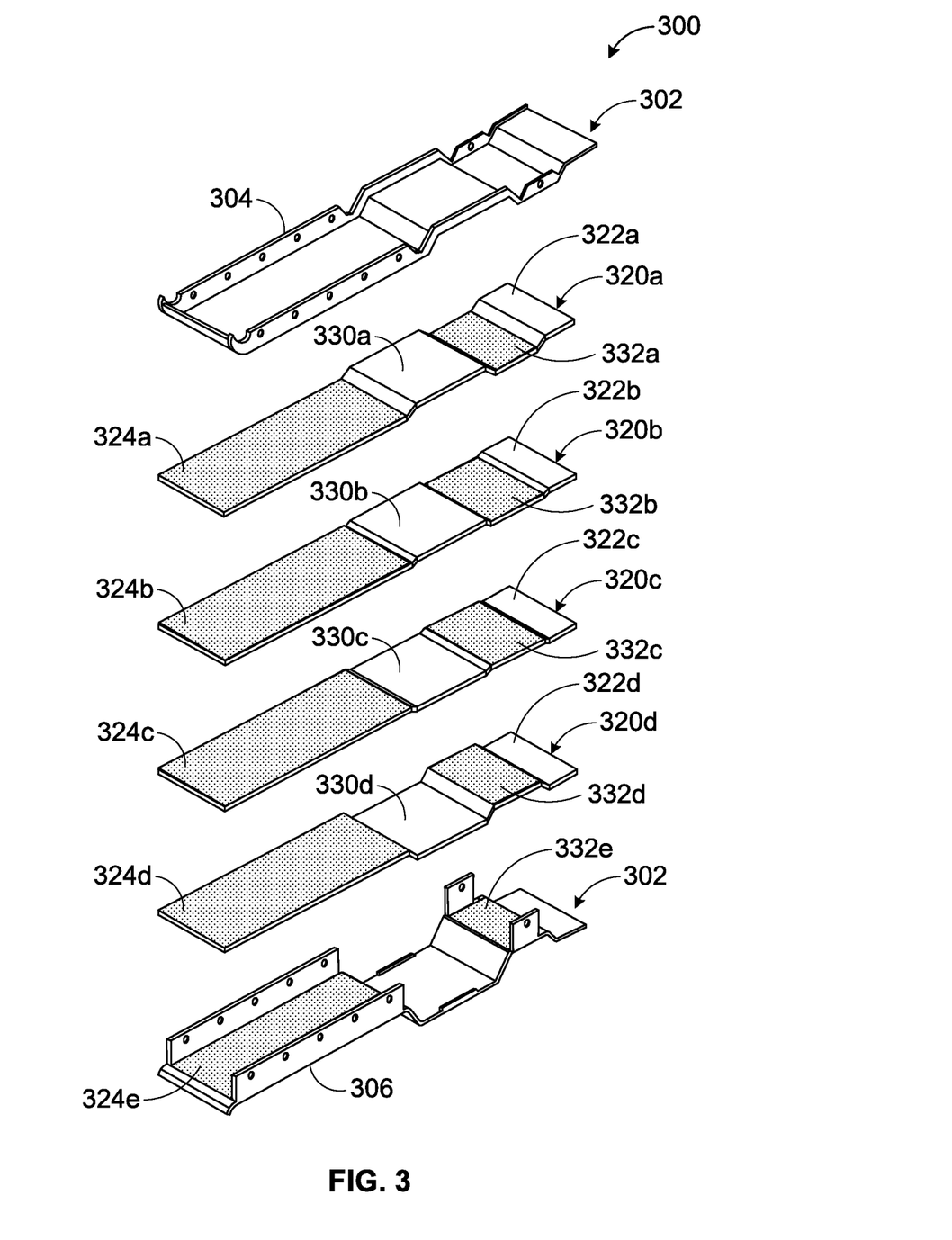
FIG. 3 is an exploded isometric view of a four-pole plug-in type busway with epoxy applied to various inner surfaces within the busway housing.

The busway 100 shown in FIG. 1 can be a feeder type, such as a busway 200 shown in FIG. 2, or a plug-in type, such as a busway 300 shown in FIG. 3. The busways 200, 300 can be based on the busway 100 of FIG. 1. Elements in FIGS. 2 and 3 that are identical in structure and operation with the corresponding elements in FIG. 1 are indicated by reference numbers that are increased by 100 and 200, respectively. New or different elements in FIGS. 2 and 3 are provided new reference numbers that do not have a counterpart in FIG. 1. For ease of discussion, a description of those elements referenced by like reference numbers that have been increased by 100 or 200 will not be repeated again. Instead, reference is made to the corresponding elements starting with reference number 100 in FIG. 1.

As stated above, FIG. 2 illustrates a feeder-type busway 200, which is intended for long straight runs of electrical busbars. It should be emphasized that in the field of electrical distribution equipment and systems, the terms busway and busbar (sometimes written as bus bar) have well understood meanings, and those meanings are intended to be ascribed to these terms as used herein. Busbars carry significant amounts of electrical current, such as hundreds or even thousands of amps. Two or more busways can be joined together using joint packs, which are installed between the raised areas of the busbars 220*a,b,c*, such as indicated by where the reference numbers 204, 206, and 222*a,b,c* are pointing. These areas remain bare (i.e., the metal is exposed and no dielectric is applied over these areas) so that they can directly interface with corresponding metal contacts of a joint pack. Thus, they do not need to be, nor should they be, insulated. Note that for ease of illustration, the optional side pieces (reference numbers 108, 110 in FIG. 1) have been omitted from FIG. 2. As noted above, in some embodiments, an insulating coat 224*a* and 224*d* is applied only between the outermost conductors 220*a*, 220*c* and an inner surface of the top piece 204 and the bottom piece 206, respectively. In other words, in these embodiments, no insulating coat 224*b,c* is applied between adjacent pairs of conductors 220*a,b,c*. However, in the illustrated example of FIG. 2, an insulating coat 224*a,b,c,d* is applied on each elongate surface of each busbar conductor 220*a,b,c* such that an insulating coat 224*a,d* exists between the outermost conductors and the inner surfaces of the top and bottom pieces 204, 206 of the housing 202, and an insulating coat 224*b,c* also appears between the conductor pairs 220*a,b* and conductor pairs 220*b,c*. In this stacked configuration, when the insulating coat 224 is an epoxy that cures, the adhesion characteristics of the epoxy operate to improve the mechanical strength of the busway 200.

FIG. 3 illustrates a plug-in type busway 300 having four poles or phases of electricity (hence four busbar conductors 320*a-d*). The fourth pole is conventionally used for a neutral connection. Plug-in type busways have one or more raised (e.g., out of a plane that defines a major flat surface of the elongate conductor 320) portions 330*a-d* along the elongate surfaces of the conductors 320*a-d* to accommodate one or more plug-in or bolt-on devices for connecting to branch circuits. No epoxy is applied to the raised portions 330*a-d*, because a plug-in unit, for power take off or control, can be connected to the plug-in type busway 300 at these raised portions 330*a-d*. Epoxy is applied only in the flat portions of the conductors 320*a-d* as indicated by the reference numbers 324*a-e*, 332*a-e*. A joint pack, as that term is understood by those skilled in the art of electrical distribution systems, can be secured onto the exposed ends 322*a-e* of the busway 300.

Figure 4:
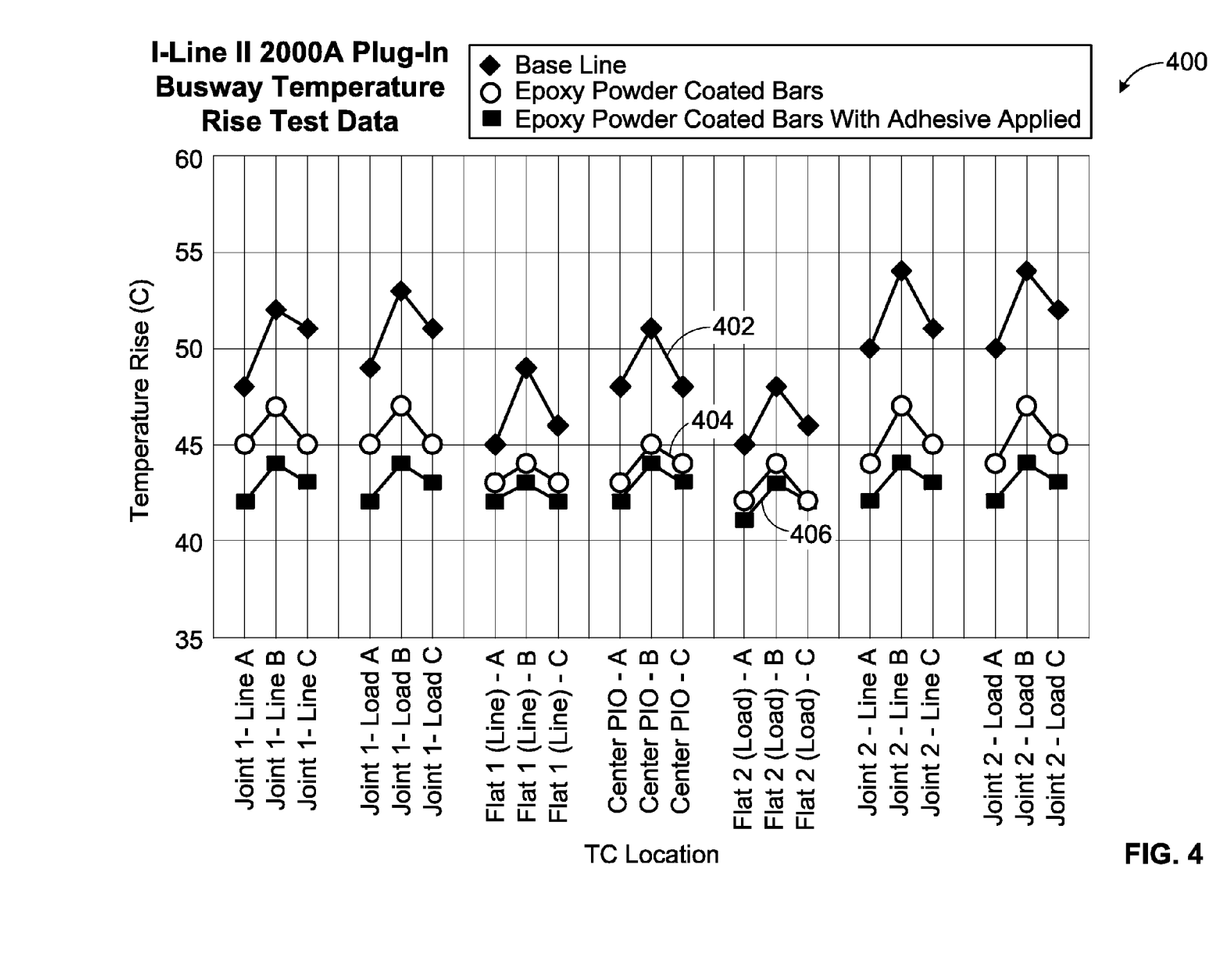
FIG. 4 is a chart showing temperature rise curves for three different types of busways, two of which are conventional and one of which uses the inventive aspects disclosed herein.

FIG. 4 is a chart 400 illustrating dramatic results obtained by the application of the epoxy according to the present disclosure. To obtain the data plotted on the chart 400, temperature sensors were placed at the same locations along three different sets of busways. From left to right on the chart 400, the following items were included in the test setup: a first joint pack, a first busway, a central joint pack or bus connector, a second busway, a second joint pack, and a third busway. Temperature measurements were taken along a first busway set, called the base line in the legend shown on the chart 400, three conductors (phases A, B, C) without epoxy insulation (e.g., powder coated insulation) or a dielectric material according to the present disclosure. The abscissa axis of the chart 400 illustrates the location where each temperature sensor was placed between the line side of the busway and the load side. The ordinate axis of the chart 400 represents the temperature rise (compared to a non-energized busbar conductor) measured by each sensor in Celsius once the busbar conductor is energized (e.g., electrical current is passed through it). The first curve 402 represents the temperature rises measured on the first base line busway, and compared to the other temperature rise measurements, it can be seen that these measured temperature rises are relatively high, such as above 54 degrees Celsius. Thus, the base line busway exhibited relatively poor thermal efficiency as the conductors radiated away into the ambient environment some of the energy as thermal energy.

Temperature measurements were taken along a second busway having epoxy-powder-coated busbar conductors only and without any of the flowable dielectric material according to the present disclosure. The second curve 404 represents the temperature rises measured on the second busway, and compared to the first curve 402, these temperature rise measurements show a marked reduction in the temperature along the entire length of the second busway. No measurement exceeded 48 degrees Celsius.

Finally, temperature measurements were taken along a third busway having insulated busbar conductors and a dielectric material as disclosed herein applied between each busbar conductor and between the outermost busbar conductors and the top and bottom housing pieces of the busway, such as described and illustrated in connection with FIGS. 1-3 herein. A third curve 406 represents the temperature rises measured along the length of the third busway. At every measurement location, the temperature rise measured was lower compared to the corresponding temperature rises seen on the second busway. Thus, the thermal efficiency of the busway according to the present disclosure is improved compared to conventional busways. As stated above, other advantages can include an improvement in the mechanical integrity of the busway and the dielectric integrity of the insulating areas inside the busway housing.

Figure 5:
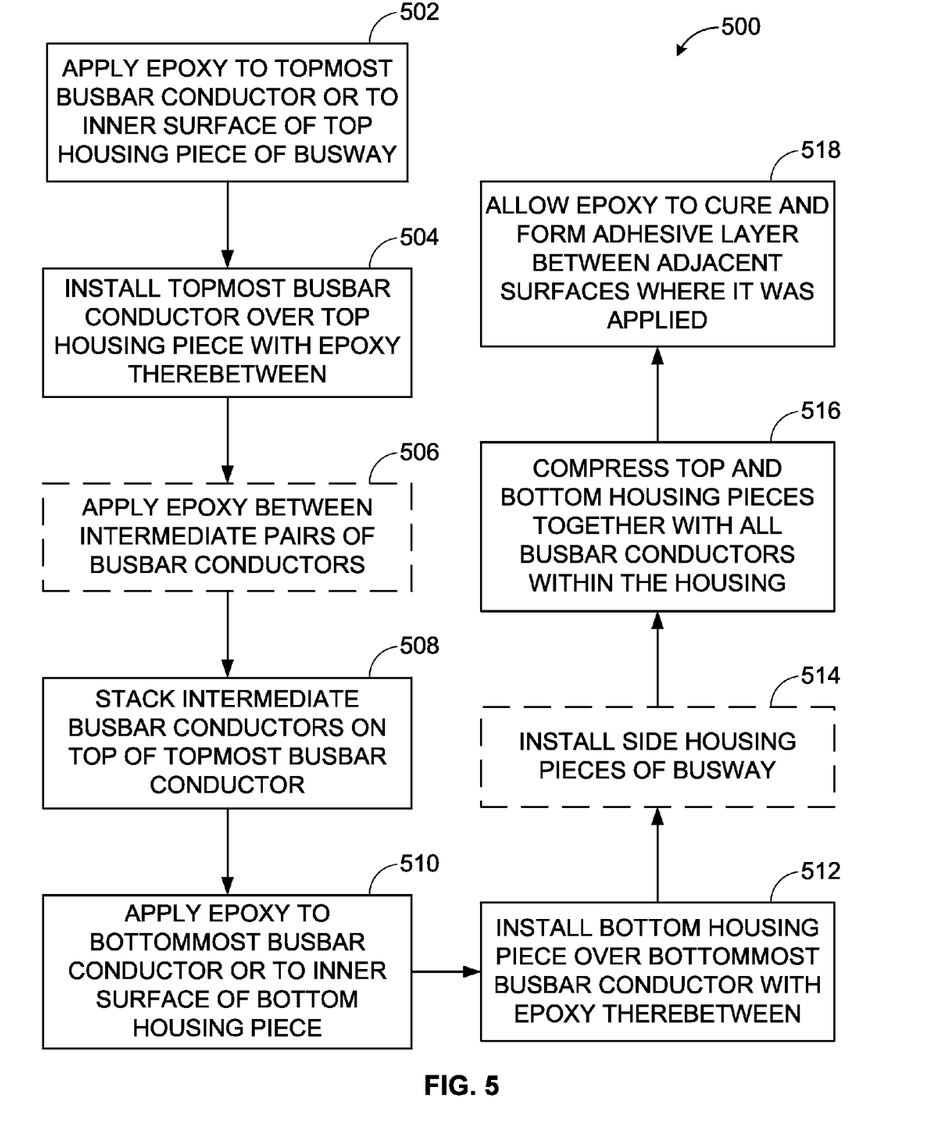
FIG. 5 is a flowchart of an exemplary method of assembling a busway according to aspects of the present disclosure.

FIG. 5 illustrates a method 500 of assembling a busway, such as any busway disclosed here including shown and described in connection with FIGS. 1-3. Methods already described above can be used with or instead of the method 500 shown in FIG. 5. This method 500 is one exemplary method of many methods contemplated by the present disclosure.

A first insulated busbar conductor (such 120a shown in FIG. 1) having a first electrically insulating coat surrounding at least a section of the first conductor (such as 122a shown in FIG. 1) is provided. An amount of flowable dielectric material (e.g., 124a) is applied to either or both of (1) a major flat surface of the first electrically insulating coat (e.g., 122a) of the first busbar conductor (e.g., 120a) and (2) an inner surface of a first piece (e.g., top 104) of a housing 102 of the busway (502). As stated above, for ease of discussion instead of referring to applying the dielectric material to the insulating coat of a busbar conductor, reference may be made to applying a dielectric material "to" a busbar conductor, but it is understood that the busbar conductor has a dielectric coating surrounding the bare metal surfaces of the conductor. When referring to the metal conductor itself, reference may be made to the "bare" or "naked" conductor. By "either or both of," it is meant that the dielectric material can be applied to (1) only, (2) only, or both (1) and (2) in either order. In other words, the application of the dielectric material between two opposing surfaces is not intended to be limited to application on one of the surfaces, when it can be readily applied to the other surface or to both surfaces.

The first busbar conductor (e.g., 120a, 122a) is installed into the housing 102 such that the major flat surface of the first insulating coat (e.g., 122a) abuts the inner surface of the first piece (e.g., 104) of the housing 102 (504). In a non-limiting example, the busway 100 can be assembled "upside down," with the top piece 104 being laid down first, followed by the busbar conductors, and finally the bottom piece 106 (512) (and optionally the side pieces 108, 110) before being compressed together to form an enclosed busway 100 (516). Of course, the busway 100 can also be assembled "right side up," with the bottom piece 106 being laid down first, followed by the busbar conductors, and finally the top piece 106 (and optionally the side pieces 108, 110). Again, whether the assembly starts with the top piece 104 or with the bottom piece 106 is not an essential feature of the present disclosure.

In an aspect of the present disclosure, only one busbar conductor 120a, 122a needs to be installed into the busway housing 102. The second piece (e.g., 106) of the housing 102 is installed over the first busbar conductor (512), and then a pressure is applied to compress the first piece of the housing 102 and the first conductor together to cause the applied dielectric material to be interposed between the inner surface and the outer surface of the first insulating coat (516). For example, the applied dielectric material can flow uniformly across the interface between the aforementioned inner and outer surfaces. Finally, the applied dielectric material (e.g., epoxy) is allowed to cure and form an adhesive layer between all surfaces where it was applied (518).

As mentioned above, it is not essential to apply the dielectric material between adjacent pairs of busbar conductors due to the reduced likelihood that a pinhole through an insulating coat of one busbar conductor will align with a corresponding pinhole through an insulating coat of another busbar conductor. However, when the housing pieces 104, 106 are electrically conductive, the dielectric material is applied between the inner surfaces (facing an interior space of the housing 102) of the housing pieces and the busbar conductor(s) that abut against those inner surfaces to ensure that any pinholes formed in the insulating coat of the installed busbar conductor(s) are plugged or covered by the dielectric material, eliminating any unintended current paths between an energized conductor and the grounded housing 102, for example.

However, it is contemplated that if desired a dielectric material can be applied between intermediate pairs of busbar conductors (506) to enhance the mechanical strength of the busway 100. For example, in FIG. 1, two intermediate dielectric layers 124b, 124c are applied between adjacent intermediate surfaces of busbar conductor pairs 120a, 120b and 120b, 120c. Regardless of whether a dielectric material is applied between intermediate surfaces of busbar conductor pairs, the busbar conductors are stacked one on top of another over the first piece (e.g., 104) of the housing 102 (508). Once the last busbar conductor of the busway 100 is stacked, an amount of the dielectric material is applied to either or both of (1) a major flat surface of the insulating coat (e.g., 122c) of the last busbar conductor and (2) an inner surface of a second piece (e.g., 106) of the housing 102 (510). The second piece (e.g., 106) is installed over the last busbar conductor so that the dielectric material is interposed between the last busbar conductor and the inner surface of the second piece of the housing (512).

Optional side pieces, such as 108, 110, are installed on opposite sides of the first and second pieces 104, 106 to form an enclosed busway housing 102 (514). A pressure is applied to compress the first and second pieces (together with the stacked busbar conductors therebetween) together (516). The pressure is configured to eliminate any bending in the busbar conductors and to flatten them into straight, level runs of conductors and to squeeze the epoxy (e.g., 124a-d) so that it spreads out uniformly between the surfaces to which it was applied. Without limiting the scope of the present disclosure, exemplary pressure values can range from 5-50 psi depending on the size and number of the busbar conductors. A small amount of excess epoxy may "ooze" out of the edges of stacked busbar conductors, and the amount of dielectric material applied is configured to minimize any such excess epoxy. Excess epoxy can be removed prior to curing, or allowed to remain as an additional dielectric interface between the stacked busbar conductors and the side pieces 108, 110 of the housing 102. The epoxy can be selected such that it has a cure rate that accommodates the assembly time but then rapidly cures thereafter. For example, a cure rate of no more than 30 minutes allows sufficient time to assemble the busway and compress the housing pieces together, but then cures quickly thereafter. All of the epoxy is allowed to cure and form an adhesive layer between adjacent surfaces where it was applied (e.g., at the interfaces indicated by reference numbers 124a-d in FIG. 1). These adhesive bonds resist forces produced by a short circuit that tend to repel the busbar conductors away from one another within the housing 102, thereby enhancing the mechanical strength of the busway 100 compared to a busway that lacks adhesive layers 124a-d.

Alternately, instead of assembling the busway by stacking the conductors into the housing and then compressing the housing together with the conductors, the busbar conductors can be stacked independently of the housing pieces and then compressed together before being inserted as a stack into the housing 102.

The assembly methods described herein can be carried out without identifying any holes in the insulating coats of any busbar conductor, and without having to repair any such holes that formed during application of the respective insulating coats on the busbar conductors. Any such holes that formed in an insulating coat are filled or covered by the dielectric material, such as 124a,b,c,d. This assembly eliminates the need to check the insulating coats on the busbar conductors prior to installing them into the busway housing, drastically reducing the assembly time and ensuring the dielectric integrity of the assembled busway 100.

The dielectric material, e.g., 124a-d, can be applied according to a pattern to a surface. The pattern is configured to ensure that the dielectric material spreads out and forms a uniform layer across the entire surface to which it is applied once a pressure is applied either by the weight of another busbar or by an externally applied pressure. The amount of flowable dielectric material is applied at a uniform rate along most or the entirety of the length of the busbar conductor. The pattern can be applied manually by a human installer or automatically using a nozzle that dispenses a bead of epoxy at a uniform rate. The pattern can be or include a single straight line (or when applied manually as straight as a steady human hand can apply) running along the center of most or all of the length of a busbar conductor. Alternately, the pattern can be or include a pattern of non-intersecting occurrences of the dielectric material spaced along at least most of the length of the major flat surface. Examples of non-intersecting occurrences include a dot-like pattern, or multiple substantially parallel lines running along most of or all of the length of the major flat surface of a busbar conductor across most of a width of the major flat surface. Alternately, the pattern can be or include a cross pattern having multiple lines that intersect one another at least once along the at least most of the length of the major flat surface of a busbar conductor.

While some of the examples herein use an epoxy as the dielectric material, such as 124a-d, 224a-d, and 324a-e, in other aspects, the dielectric material is not an epoxy but is still flowable. For example, grease can be a suitable dielectric material that is flowable, but is not an adhesive.

Words of degree, such as "about", "substantially", and the like are used herein in the sense of "at, or nearly at, when given the manufacturing, design, and material tolerances inherent in the stated circumstances" and are used to prevent the unscrupulous infringer from unfairly taking advantage of the invention disclosure where exact or absolute figures and operational or structural relationships are stated as an aid to understanding the inventive aspects disclosed herein.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A method of assembling a busway, comprising:
    providing a first insulated busbar conductor having a first electrically insulating coat surrounding at least a section of the first conductor;
    applying an amount of flowable dielectric material to either or both of (1) a major flat surface of the first insulating coat of the first conductor and (2) an inner surface of a first piece of a housing of the busway;
    installing the first conductor into the housing such that the major flat surface abuts the inner surface of the first piece of the housing; and
    responsive to the installing, applying a pressure to compress the first piece of the housing and the first conductor together to cause only the applied flowable dielectric material to be interposed between the inner surface of the first piece of the housing and the outer surface of the first insulating coat of the first conductor,
    wherein the applied flowable dielectric material flows when the pressure is applied.

2. The method of claim 1, further comprising:
    arranging in a stacked relationship the first conductor and a second insulated busbar conductor having a second electrically insulating coat surrounding at least a section of the second busbar conductor,
    wherein, responsive to the arranging, the applying the pressure operates to compress the first and second conductors together to cause the dielectric material to be interposed between the major flat surface of the first insulating coat and a major flat surface of the second insulating coat that opposes the major flat surface of the first insulating coat.

3. The method of claim 2, wherein the dielectric material is an epoxy adhesive, the method further comprising allowing the epoxy adhesive to set to form an adhesive bond between the first and second conductors to resist forces produced by a short circuit that repel the first and second conductors away from one another.

4. The method of claim 2, further comprising:
    applying an amount of the dielectric material between either or both of (1) a major flat surface of the second insulating coat or a major flat surface of a further insulating coat of a further insulated busbar conductor and (2) an inner surface of a second piece of the housing of the busway; and
    installing the second piece over the second conductor or the further conductor,
    wherein the applying the pressure operates to compress the second piece of the housing and the second conductor or the further conductor together to cause the dielectric material to be interposed between the major flat surface of the second insulating coat or the further insulating coat and an inner surface of the second piece of the housing.

5. The method of claim 4, wherein the first piece of the housing is a top of the housing, and the second piece of the housing is a bottom of the housing, the method further comprising installing a side piece of the housing along respective side edges of the first and second busbar conductors and between the first and second pieces of the housing.

6. The method of claim 2, further comprising:
    applying to a major flat surface of a third electrically insulating coat that surrounds at least a section of a third busbar conductor an amount of the flowable dielectric material,
    wherein the stacked relationship includes the third conductor, and
    wherein the pressure is applied to compress the first, second, and third conductors together to interpose the dielectric material between the second and third conductors.

7. The method of claim 6, wherein each of the first, second, and third conductors is configured to carry mutually distinct phases of electrical current.

8. The method of claim 6, further comprising, responsive to compressing the first, second, and third conductors together, installing the first, second, and third conductors as an assembly into the housing of the busway.

9. The method of claim 2, further comprising, responsive to applying the pressure, installing the first and second conductors into the housing of the busway.

10. The method of claim 1, wherein the insulating coat of the first conductor is made from an epoxy powder.

11. The method of claim 1, wherein the busway is assembled without identifying, in the insulating coat of the first conductor, or repairing holes that formed during application of the insulating coat on the first conductor, wherein the holes in the insulating coat of the first conductor are at least partially filled or completely covered by the dielectric material.

12. The method of claim 1, wherein a temperature rise of the busway when electrical current is supplied through the first busbar conductor is lower compared to a temperature rise of a busway that is identically configured but lacks the dielectric material and the first piece of the housing.

13. The method of claim 1, wherein the dielectric material is applied, according to a pattern, substantially uniformly along at least most of a length of the major flat surface having an elongate form.

14. The method of claim 13, wherein the pattern includes a substantially straight line running along at least most of the length of the major flat surface substantially in a center of a width of the major flat surface.

15. The method of claim 13, wherein the pattern includes a pattern of non-intersecting occurrences of the dielectric material spaced along at least most of the length of the major flat surface.

16. The method of claim 15, wherein the pattern of non-intersecting occurrences resembles a dot-like pattern.

17. The method of claim 13, wherein the pattern includes a plurality of substantially parallel lines running along at least most of the length of the major flat surface across most of a width of the major flat surface.

18. The method of claim 13, wherein the pattern includes a cross pattern having multiple lines that intersect one another at least once along the at least most of the length of the major flat surface.

19. The method of claim 13, wherein the pattern is applied using a nozzle that outputs a bead of the dielectric material.

20. The method of claim 1, wherein the busway is of a plug-in or a feeder type.

21. The method of claim 1, wherein the dielectric material is one of uncured epoxy or grease.

* * * * *